United States Patent [19]

Saito et al.

[11] Patent Number: 5,297,878
[45] Date of Patent: Mar. 29, 1994

[54] METHOD OF THERMAL WAX TRANSFER PRINTING

[75] Inventors: Hitoshi Saito; Masamichi Sato; Kenji Yamakawa; Yasuko Sonoda, all of Tokyo, Japan

[73] Assignee: Fuji Photo Film Co., Ltd., Kanagawa, Japan

[21] Appl. No.: 24,813

[22] Filed: Mar. 1, 1993

Related U.S. Application Data

[63] Continuation-in-part of Ser. No. 699,581, May 14, 1991, abandoned.

[30] Foreign Application Priority Data

May 15, 1990 [JP] Japan .................. 2-124474
May 24, 1990 [JP] Japan .................. 2-134345
Jun. 21, 1990 [JP] Japan .................. 2-163726

[51] Int. Cl.$^5$ .................................... B41J 2/32
[52] U.S. Cl. ........................... 400/120; 346/76 PH
[58] Field of Search .......... 346/76 PH; 400/120 ME, 400/120 MP, 120 MT, 120

[56] References Cited

U.S. PATENT DOCUMENTS

| | | | |
|---|---|---|---|
| 4,779,102 | 10/1988 | Sasaki | 400/120 |
| 4,810,111 | 3/1989 | Sogami et al. | 400/120 |
| 4,933,686 | 6/1990 | Izumi et al. | 400/120 |
| 4,952,085 | 8/1990 | Rein | 400/120 |
| 4,977,410 | 12/1990 | Onuki et al. | 400/120 |
| 5,003,323 | 3/1991 | Onuki et al. | 400/120 |

FOREIGN PATENT DOCUMENTS

| | | | |
|---|---|---|---|
| 0021266 | 2/1985 | Japan | 400/120 |
| 0180860 | 9/1985 | Japan | 400/120 |
| 0206674 | 9/1986 | Japan | 400/120 |
| 0095281 | 5/1987 | Japan | 400/120 |
| 0264975 | 11/1987 | Japan | 400/120 |

Primary Examiner—Edgar S. Burr
Assistant Examiner—Christopher A. Bennett
Attorney, Agent, or Firm—Birch, Stewart, Kolasch & Birch

[57] ABSTRACT

A thermal head is moved in a sub scan direction relatively to a recording paper, the thermal head having a plurality of heating elements disposed along a main scan direction. The length of each heating element along the main scan direction is longer than its length along the sub scan direction. While the thermal head moves by a distance corresponding to the width of a picture cell, drive time of each heating element, in which each heating element is driven continuously or intermittently, is controlled to change the recording area of wax type ink dot transferred to the recording paper. Adjacent ink dots in the main scan direction are displaced by a predetermined distance in the sub scan direction. If a thermal head is intermittently moved by a unit movement amount, the unit movement amount is set smaller than the width of the heating element in order to achieve a high gradation. In printing a color image using at least three types of inks including cyan, magenta, and yellow, the recording positions of the color inks are displaced. In order to prevent hue change and color moire of an image, the picture cell density is set different in the sub scan direction at least between cyan and magenta.

18 Claims, 16 Drawing Sheets

FIG. 2
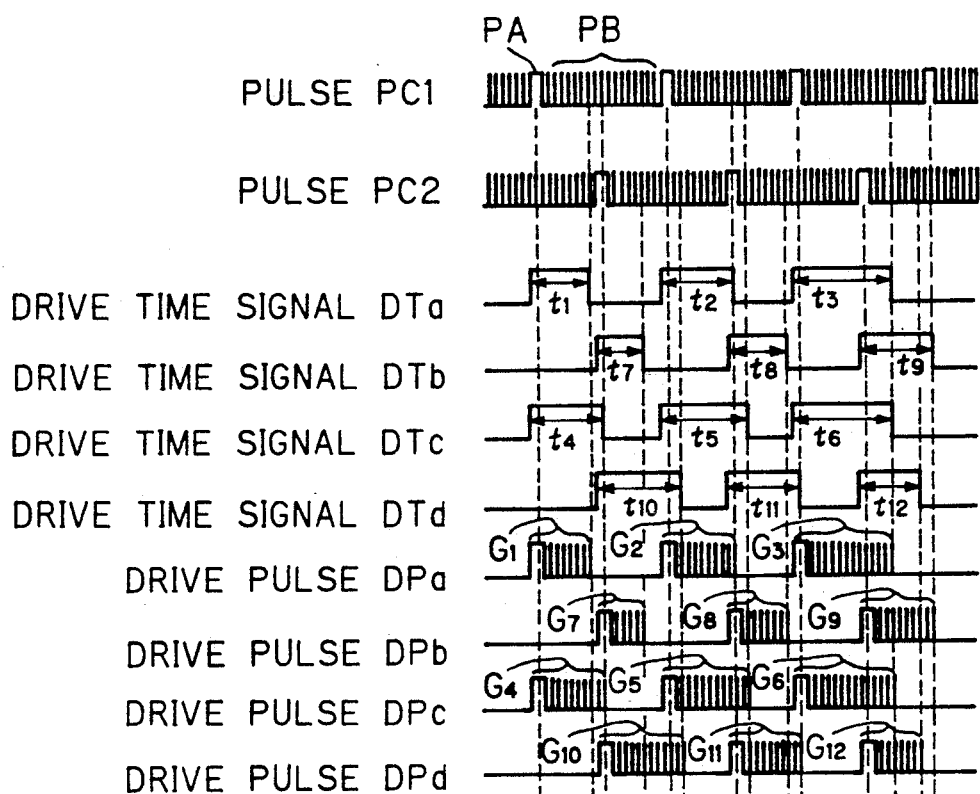
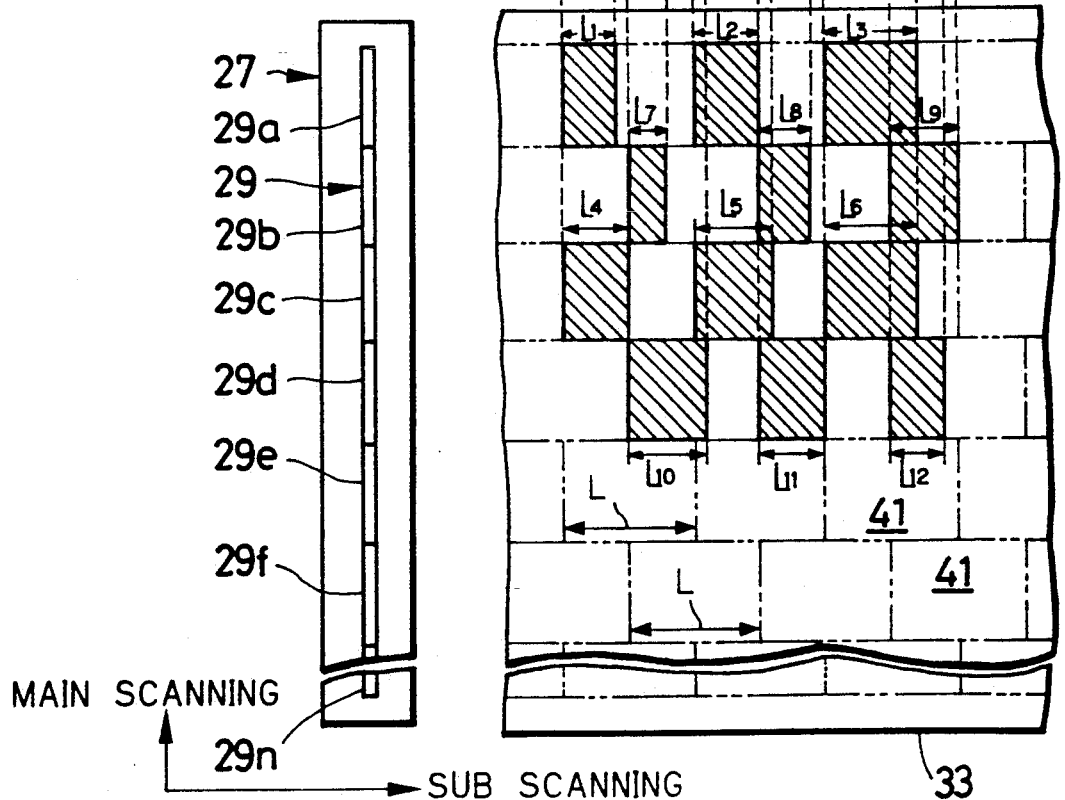

YELLOW: 100 LINE/INCH

MAGENTA: 100 LINE/INCH

CYAN: 100 LINE/INCH

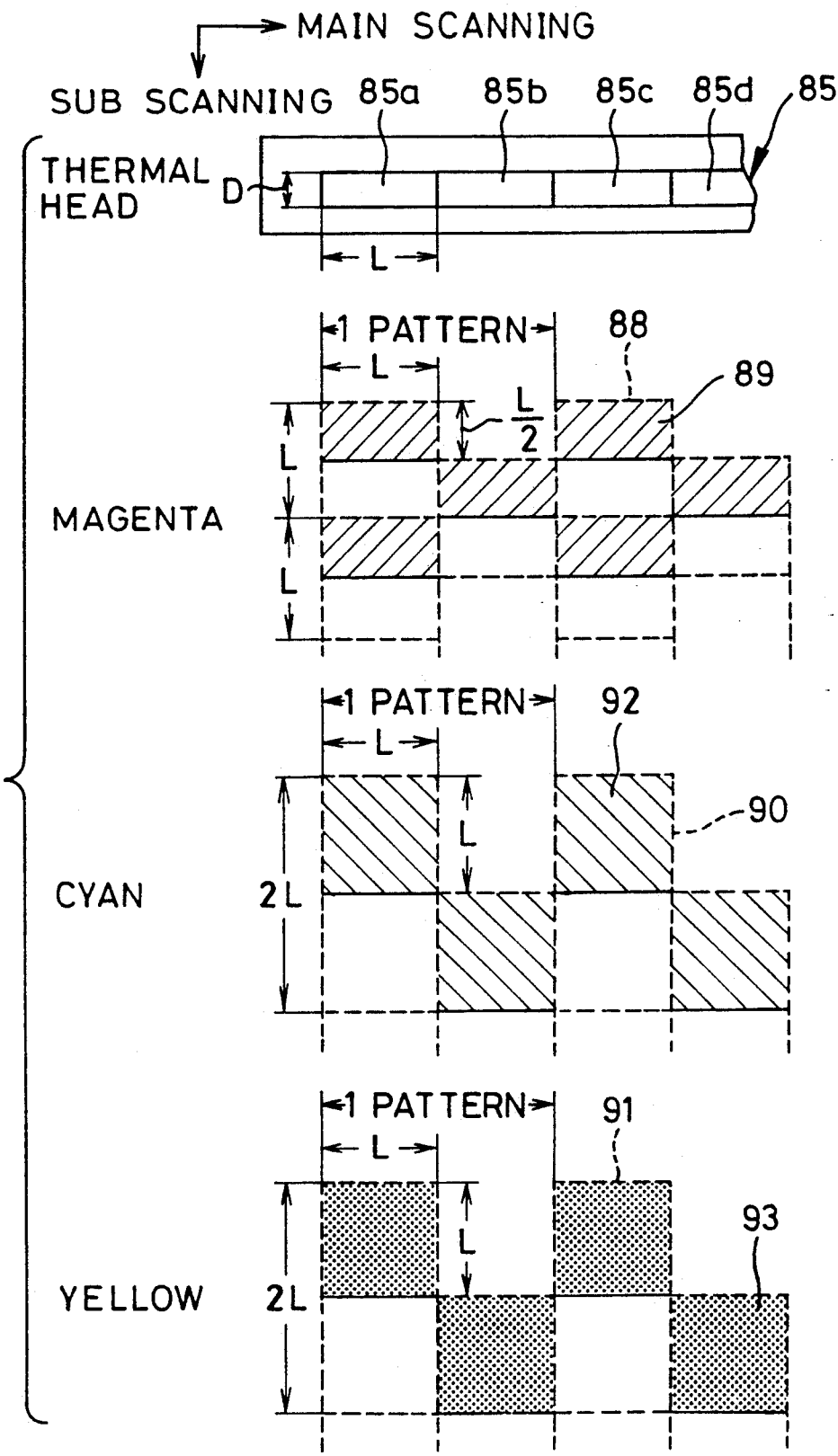

FIG. 14A

| FIRST COLUMN | SECOND COLUMN |
|---|---|
| Y | B |
| K | WH |
| G | M |
| C | R |
| M | G |
| WH | K |
| Y | B |
| K | WH |
| G | M |
| C | R |
| M | G |

FIG. 14B

| FIRST COLUMN | SECOND COLUMN |
|---|---|
| R | C |
| G | M |
| B | Y |
| WH | K |
| R | C |
| G | M |
| B | Y |

FIG. 14C

| FIRST COLUMN | SECOND COLUMN |
|---|---|
| M | G |
| R | C |
| G | M |
| K | WH |
| B | Y |
| WH | K |
| M | G |
| R | C |
| G | M |
| K | WH |
| B | Y |

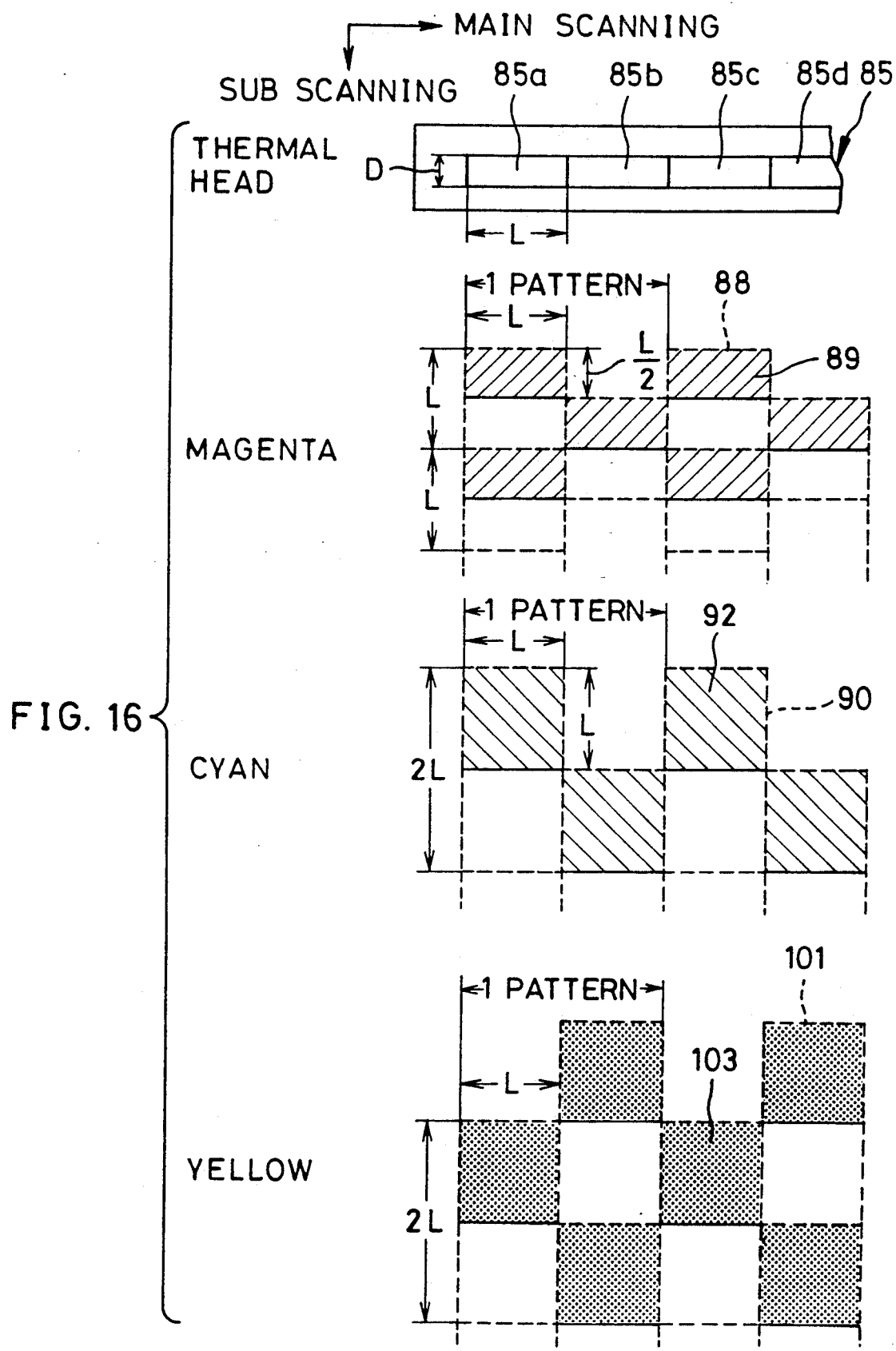

METHOD OF THERMAL WAX TRANSFER PRINTING

This application is a continuation-in-part, of application Ser. No. 07/699,581 filed on May 14, 1991, now abandoned.

BACKGROUND OF THE INVENTION

1. Field of the Invention

The present invention relates to a thermal wax transfer printing method suitable for printing a half tone image.

2. Description of Related Background Art

A thermal transfer printing method includes a thermal wax transfer type printing method and a sublimation type printing method. With the thermal wax transfer type printing method, the back surface of an ink film is heated with a thermal head, and melted or softened ink is transferred to a recording paper. With the sublimation type printing method, dye is sublimated into an image reception layer of the recording paper. The former method cannot adjust the amount of ink transfer according to heat energy, so that it is used for printing a binary value image such as characters and lines. The latter method can adjust the amount of dye according to heat energy, so that it is used for printing a half tone image.

Although the conventional thermal wax transfer type printing method cannot print a half tone image, it has various advantages. Namely, there is left only a small trailing line after a printed line as compared to the sublimation type, the trailing line resulting from a thermal hysteresis of a thermal head. The stability of a printed image is large as compared to the sublimation type. Paying attention to the advantages of the thermal wax transfer type printing method, the inventors of this invention developed an improved printing method capable of printing a half tone image having a high gradation by using a plurality of heating elements or resistive elements disposed in the disposing direction or a main scan direction, and by changing the length of a recorded ink dot in a sub scan direction perpendicular to the main scan direction in accordance with the density of a picture element to be recorded.

This improved printing method has been found, however, unsatisfactory. Namely, since the length of a heating element in the sub scan direction is a minimum recording width, it is necessary to narrow the length of a heating element to improve the gradation of a printed image. However, there is a limit in narrowing the length of a heating element in view of the durability and manufacturing cost, resulting in a hardship of high gradation.

Furthermore, with the above-described improved printing method, virtual picture cells each capable of being printed with an ink dot of a maximum size are arranged in a matrix. Therefore, if one line in the main scan direction is recorded in the same density, a plurality of rectangular ink dots each having the same size are printed, thereby forming a line extending in the main scan direction. Therefore, a plurality of conspicuous parallel lines extending in the main scan direction are included in a printed image depending upon the type of an image pattern of an original. An original image having a plurality of parallel lines, particularly, a rattan blind, will produce moire because of a superposition of original parallel lines and the above conspicuous parallel lines. If an original image has oblique lines, the oblique lines will have notches.

In printing a color image by using the above-described improved printing method, a plurality of color ink dots are recorded superposed one upon another in each picture cell as shown in FIGS. 10A to 10C. In FIGS. 10A to 10C, virtual three picture cells in the main scan direction and virtual two picture cells in the sub scan direction are shown by broken lines, totaling six picture cells. The density or size of the picture cell of each color in the main and sub scan directions is set for example to 100 lines/inch (8 ink dots/mm), and the size of a picture cell is for example $125 \times 125$ μm. FIG. 10A shows cyan ink dots recorded in all six picture cells $2a$ to $2f$ as indicated by hatched portions. FIG. 10B shows magenta ink dots recorded in all six picture cells $3a$ to $3f$. FIG. 10C shows yellow ink dots recorded in picture cells $4a$, $4b$, $4e$, and $4f$ among six picture cells $4a$ to $4f$. If color registration is complete, i.e., if there is no alignment error of colors, for example, picture cells $2a$, $3a$ and $4a$ take the same position on a recording paper so that the recorded ink dots are superposed one upon another to form a half tone through the subtractive mixture. If color registration is complete, it is possible to print a color hard copy having a high image quality. However, if there occurs a shear of color registration in the sub scan direction, it has been found that the hue of an image will change. For example, the color of a face changes between yellowish and pinkish. Such hue change becomes maximum if the shear of color registration in the sub scan direction is as large as a half (pitch) of a picture cell multiplied by an integer. In order to eliminate hue change and reproduce an original image with high fidelity, the shear of color registration should be suppressed several μm or smaller if a picture cell is $125 \times 125$ μm. However, a thermal wax transfer type color printing apparatus presently available is difficult to obtain a highly precise alignment of colors.

SUMMARY OF THE INVENTION

It is therefore a principal object of the present invention to provide a thermal wax transfer type printing method capable of eliminating conspicuous parallel lines extending in the main scan direction and removing moire and oblique line notches.

It is another object of the present invention to provide a thermal wax transfer type printing method having less hue change of a printed image even if a shear of color registration is present.

It is a further object of the present invention to provide a thermal wax transfer type printing method with less color moire and picture pattern moire.

It is a still further object of the present invention to provide a thermal wax transfer type printing method capable of printing an image having a high gradation without narrowing the length of a heating element in the sub scan direction.

In order to achieve the above objects of the present invention, the length of an ink dot along the sub scan direction perpendicular to the direction of disposed heating elements is changed with the recording density. In addition, adjacent ink dots are displaced in the sub scan direction by a predetermined distance, e.g., by a half of the length of a picture cell in the sub scan direction. Since the recording positions of ink dots adjacent in the main scan direction are displaced in the sub scan direction, a line extending straight in the main scan direction will not be formed, thereby eliminating moire and oblique line notches. It is obvious that the distortion of an image is negligible even if the recording positions are displaced, because the size of each picture cell is very small.

According to a preferred embodiment of the present invention, while a thermal head is continuously or intermittently moved relatively to a recording paper by a distance corresponding to a picture cell in the sub scan direction, the drive time of each heating element is controlled in accordance with the recording density, and the drive timings of adjacent heating elements are shifted so as to displace the positions of adjacent picture cells in the sub scan direction. The heating elements are driven in the drive time continuously or intermittently. According to another preferred embodiment of the present invention, there is used a thermal head having adjacent heating elements displaced by a predetermined distance in the sub scan direction. The drive time of each heating element is controlled in accordance with a recording density to displace the positions of adjacent picture cells in the sub scan direction.

According to a further preferred embodiment of the present invention, the length of a printed ink dot in the sub scan direction is changed in accordance with the recording density, and there is provided a picture cell density difference or picture size difference at least between cyan and magenta along the sub scan direction. Since the density of ink dots is changed for particular colors, it is possible to avoid hue change otherwise caused by a shear of color registration. An image is printed with rectangular dots so that, if an original image contains a picture pattern such as a rattan blind, moire within the picture pattern (hereinafter called picture pattern moire) will be generated. In order to eliminate both picture pattern moire and hue change, there is provided a picture cell density difference at least between cyan and magenta in the sub scan direction, and the printing positions of ink dots adjacent in the main scan direction are displaced in the sub scan direction.

According to a still further preferred embodiment, a thermal head is intermittently moved by a unit movement amount relatively to a recording paper. The unit movement amount is made shorter than the length (width) of a heating element along the sub scan direction. At each unit movement, a heating element is driven and the length of a printed ink dot is changed along the sub scan direction in accordance with the density of the picture element to be recorded in one picture cell. Accordingly, an image with a high gradation can be printed without narrowing the length of a heating element, thereby providing a longer life of a thermal head and a low manufacturing cost.

According to an additional preferred embodiment, a length of the picture cells of two of the three colors relative to the sub scan direction is determined to be two times as long as a length of the picture cells of the one remaining color relative to the sub scan direction. In other words, a cell density or minuteness of the picture cells of two of the three colors relative to the sub scan direction is determined to be half as high as a cell density of the picture cells of the one remaining color relative to the sub scan direction. Further, respectively for the three colors, positions of the picture cells adjacent in the main scan direction are shifted along the sub scan direction, by half the length of the picture cells relative to the sub scan direction. To shift the positions of the adjacent picture cells along the sub scan direction, the positions can be shifted in a same direction for the three colors, or in opposite directions for the two colors having the twofold length. Although color cycles of dotted columns extended in the sub scan direction may be changed, yet each pair of adjacent colors within a pair of adjacent columns unfailingly falls on is a certain part of complementary colors, even when there is a shear of color registration. Notwithstanding some microscopic changes in the colors, the colors as changed are so compensated macroscopically that the general hue of the printed image is unchanged. There is no conspicuous irregularity in hue. The result of the present embodiment lies in prevention of degradation in the image quality due to shears in color registration.

BRIEF DESCRIPTION OF THE DRAWINGS

The above and other objects and advantages of the present invention will become apparent for those skilled in the art from the following detailed description of the invention when read in connection with the accompanying drawings, in which:

FIG. 2 shows waveforms at various circuits of the apparatus shown in FIG. 1 and the corresponding recorded ink dots;

FIG. 11 is illustrative of an embodiment in which a general hue of a printed image is kept unchanged by maintaining a compensatory coloring even when there is a shear of color registration, and illustrating a thermal head and states of recording ink dots in cyan, magenta and yellow picture cells;

FIG. 14A-14C are illustrative of columns produced when shears in color registration take place;

FIG. 16 is a variant of the embodiment illustrated in FIG. 11.

DETAILED DESCRIPTION OF THE PREFERRED EMBODIMENTS

Figure 1:
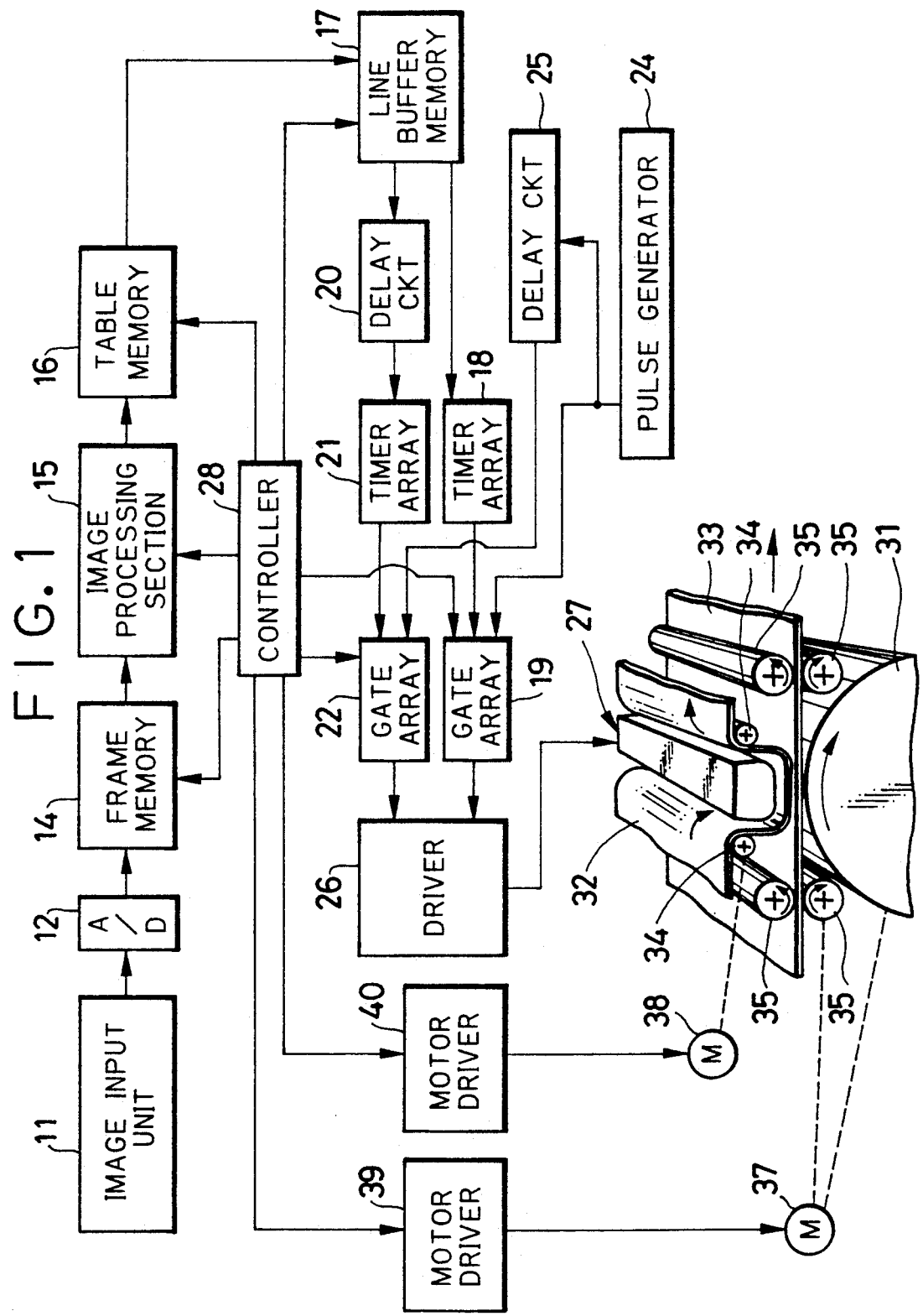
FIG. 1 is a block diagram showing the outline of a thermal wax transfer type printing apparatus embodying the present invention.

Referring to FIG. 1, an analog image signal of respective picture elements picked up by an image input unit 11 such as a TV camera, an image scanner, or the like, is converted into a digital image signal by an A/D converter 12, and written in a frame memory 14. In printing an image, image signals at picture elements of one line along the main scan direction, read from the frame memory 14, are sent to an image processing section 15 to be subjected to a tone correction, and supplied to a table memory 16.

In the table memory 16, an image data of each picture element is converted into a drive time data for driving each heating element of a thermal head 27, and stored in a line buffer memory 17. The odd dot data of the time data of one line read from the line buffer memory 17 is converted from a digital data into a pulse width data by a timer array 18 and sent to a gate array 19. On the other hand, the even dot data of drive time data of one line is sent to a gate array 22 via a delay circuit 20 and a timer array 21. The delay circuit 20 outputs the even dot image data to the timer array 21 such that it is printed at a timing delayed from the odd dot data by the amount corresponding to a predetermined distance, e.g., one half the width of a picture cell, in the sub scan direction.

The gate array 19 is connected to a pulse generator 24 for generating a pulse PC1 having a waveform shown in FIG. 2. The gate array 22 is connected via a delay circuit 25 to the pulse generator 24. The delay circuit 25 outputs a pulse PC2 delayed by a half period from the pulse PC1. Each pulse PC1, PC2 is constructed of a single start pulse PA having a long period for making a heating element quickly reach an ink melting point, and a series of pulses PB having a short period for maintaining the heating element equal to or higher than the ink melting point. The gate array 19 allows the pulse PC1 to pass therethrough for a predetermined drive time in accordance with the drive time signal from the timer array 18, to thereby generate drive pulses corresponding in number to a recording density and send them to a driver 26. Similarly, the gate array 22 controls the passage of the pulse PC2 to generate drive pulses corresponding in number to a density and send them to the driver 26.

The driver 26 powers each heating element of the thermal head 27 for a predetermined time period by using drive pulses, to thereby heat the element. A controller 28 is connected to the above-described frame memory 14, image signal processing section 15, table memory 16, line buffer memory 17, and gate arrays 19 and 22, to synchronize them for the control of the whole system. A platen 31 is mounted under the thermal head 27. An ink film 32 and a recording paper 33 superposed one upon the other are fed at a constant speed between the platen 31 and thermal head 27, by means of resin rollers 34 and rubber rollers 35. When the ink layer of the ink film 32 is heated by the thermal head 27 to a predetermined melting point or higher, ink in the ink layer is melted and an image is transferred to the recording paper 33. The platen 31 and rubber rollers 35 are driven by a pulse motor 37, and the resin rollers 34 are driven by a pulse motor 38. The rotation of the pulse motors 37 and 38 are controlled by the controller 28 via motor drivers 39 and 40.

Referring to FIG. 2, on the bottom of the thermal head 27 there is formed a heating line 29 extending in the main scan direction. The heating line 29 includes a plurality of heating elements 29a to 29n. Each of the heating elements 29a to 29n has a length of, e.g., 120 μm in the main scan direction and a width of, e.g., 20 μm in the sub scan direction. In this embodiment, a line printer is used so that the main scan direction corresponds to the widthwise direction of the recording paper 33 and the sub scan direction corresponds to the longitudinal direction of the paper 33. An image is printed on the recording paper 33 one line after another while continuously or intermittently moving the recording paper 33 in the sub scan direction. In FIG. 2, for example, a drive time signal DTa and drive pulse DPa are used for driving the heating element 29a, and a drive time signal DTb and drive pulse DPb are used for driving the heating element 29b.

The operation of the embodiment will be described below. A half tone image such as a photograph, picture or the like is converted into an image signal by the image input unit 11. The obtained image signal is supplied to the A/D converter 12, converted into image data of each picture element therein, and written in the frame memory 14. In printing an image, an image signal of each picture element read from the frame memory 14 is subjected to a tone correction by the image signal processing section 15, and sent to the table memory 16. In the table memory 16, each of image signals is converted into the drive time data for determining the ink recording area within a picture cell 41, and written in the line buffer memory 17. The drive time data for picture elements of one line is sequentially read from the line buffer memory 17 under the control of the controller 28. The drive time data for an odd dot is sent to the gate array 19 via the timer array 18, and the drive time data for an even dot is delayed by a half period by the delay circuit 20 and sent to the gate array 22.

The pulse PC1 inputted from the pulse generator 18 to the gate array 19 is allowed to pass therethrough in accordance with the drive time t1, t2, t3, t4, t5, and t6 to form drive pulses G1, G2, G3, G4, G5, and G6 which are sent to the driver 26. On the other hand, the pulse PC2 delayed by the delay circuit 25 and inputted to the gate array 22 is allowed to pass therethrough in accordance with the drive time t7, t8, t9, t10, t11, and t12 to form drive pulses G7, G8, G9, G10, G11, and G12 which are sent to the driver 26.

The driver 26 powers the heating element 29a with the drive pulses G1, G2, and G3 to record ink dots having the lengths L1, L2, and L3 in the sub scan direction on the recording paper 33. The heating element 29c is powered with the drive pulses G4, G5, and G6 to record ink dots having the lengths L4, L5, and L6 on the recording paper 33. Similarly, the heating element 29b is powered with the drive pulses G7, G8, and G9 to record ink dots having lengths L7, L8, and L9 on the recording paper 33. The heating element 29d is powered with the drive pulses G10, G11, and G12 to record ink dots having the lengths L10, L11, and L12 on the recording paper 33.

Each ink dot is recorded on the recording paper 33 within each virtual picture cell 41 from the start line toward the end line thereof. Each picture cell 41 has a size, for example, 120 μm length in the main scan direction and 160 μm length in the sub scan direction. Odd cells of picture cells 41 adjacent in the main scan direction are shifted in the sub scan direction, for example, by a distance of L/2, so that they are not recorded as a line extending straight in the main scan direction. Accordingly, no moire will be generated, no conspicuous straight line will be recorded, and a recorded oblique line will not have any notches. The area of an ink dot to be transferred to the picture cell 41 can be increased or decreased in accordance with the length of the drive pulse time, so that a good tone can be obtained even for a thermal wax transfer type printing. Furthermore, if a dither method using a matrix of 2×2 or so is used, a still better tone can be obtained.

Figure 3:
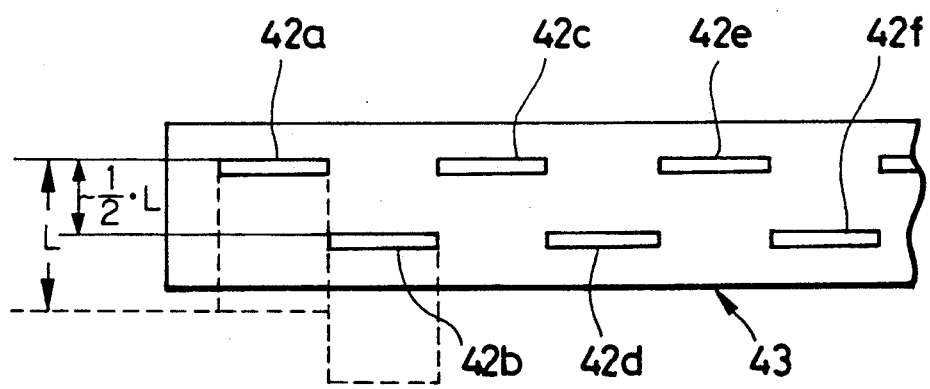
FIG. 3 is a bottom view showing a thermal head having heating elements displaced by a half pitch at every second element.

In the above embodiment, the timings of driving adjacent heating elements are shifted to change the ink dot recording positions in the sub scan direction. The positions of adjacent heating elements may be displaced in the sub scan direction to change the ink dot recording positions. A thermal head 43 of such an embodiment is shown in FIG. 3. Heating elements 42b, 42d, and 42f are displaced by L/2 from heating elements 42a, 42c, and 42e. The heating elements disposed in two rows are driven at the same time to change the ink dot recording positions by L/2, thereby obtaining the similar advantageous effects as described with the previous embodiment.

The above embodiments are directed to a monochrome printer. The present invention is also applicable to a color printer. FIGS. 4A to 4C illustrate an example of color printing with less moire and hue change. For a cyan color shown in FIG. 4A, the picture cell density in the main and sub scan directions is set to 100 lines/inch (about 8 dots/mm), so that each cyan picture cell 46a to 46f has a size of about 125×125 μm. Picture cells of an odd number in the main scan direction are shifted by a half pitch in the sub scan direction from picture cells of an even number, thereby preventing generation of picture pattern moire, which might be generated when an image such as a rattan blind having a plurality of parallel straight lines is printed.

For a magenta color shown in FIG. 4B, the picture cell density in the main scan direction is 100 lines/inch same as that of the cyan color, but the picture cell density in the sub scan direction is set to 150 lines/inch (about 12 dots/mm). Therefore, each magenta picture cell 47a to 47i has about a size of 125×83 μm. In order to prevent picture pattern moire, adjacent picture cells in the main scan direction are shifted by a half pitch in recording positions in the sub scan direction. Each yellow picture cell 48a to 48f shown in FIG. 4C has the picture cell density of 100 lines/inch in the main and sub scan directions same as the case of the cyan color, and is shifted by a half pitch in recording positions.

The present inventors made various experiments with respect to the color moire to be caused by printing three color lines, the picture pattern moire to be caused depending upon the contents of an image, and the hue change to be caused by the color registration shear. The experiment results are shown in the following table. The unit of a picture cell density is line/inch. A circle symbol represents a good result, a triangular symbol represents a poor result, and a cross symbol represents a bad result.

| Sample | 1 | 2 | 3 | 4 | 5 | 6 | 7 | |
|---|---|---|---|---|---|---|---|---|
| Half Pitch Shift | No | Yes | No | No | Yes | No | Yes | No | Yes |
| Cyan Picture Cell Density | 100 | 100 | 100 | 100 | 100 | | 100 | 100 | |
| Magenta Picture Cell Density | 100 | 100 | 125 | 150 | 150 | 150 | | | 150 |
| Yellow Picture Cell Density | 100 | 100 | 100 | 100 | 100 | | 100 | 100 | |
| Picture Pattern Moire | X | O | X | X | O | Δ | | Δ | |
| Color Moire | O | O | X | O | O | O | | O | |
| Hue Change | X | X | O | O | O | O | | O | |

As appreciated from this Table, a change in the picture cell densities of cyan and magenta effectively prevents a hue change and color moire to be caused by a shear of color registration. The hue change can be avoided by setting the picture cell density difference to about 25 lines/inch. However, with the picture cell density difference of 25 lines/inch, color moire will be generated. This color moire can be eliminated by setting the difference between picture cell densities to a value about 50 lines/inch or larger.

The picture pattern moire can be effectively avoided by shifting the recording positions of ink dots of an odd number by about 20 to 80% from those of an even number. A shift of picture cells by a half pitch is particularly effective for preventing the picture pattern moire. It has been confirmed that the effects on the hue change and color moire are the same if the picture cell densities of cyan and magenta are reversed, and that the picture cell density of yellow has not so much an influence on the occurrence of hue change and color moire.

Next, an apparatus practicing the method illustrated in FIG. 4 will be described with reference to FIGS. 5 and 6. In FIG. 5, an ink film 57 is provided with a cyan ink area 57a, magenta ink area 57b, and yellow ink area 57c at a constant pitch. A hard copy of a color image is recorded on a recording paper 58 by using three ink areas and a three-color frame sequential printing method. A color image may be formed with cyan, magenta, yellow, and black by additionally providing a black ink area to the ink film 57. In this case, the picture cell density of black is set to the same value as that of magenta.

A thermal head 59 is mounted pushing the back surface of the ink film 57. The ink film 57 is heated from its back surface to transfer melted ink to the recording paper 58. At the printing time, a head moving mechanism 50 is driven by a motor 51 to move the thermal head 59 in the sub scan direction indicated by an arrow, and returned to an initial position after printing for each color. This head moving mechanism 50 is constructed of, e.g., a belt, feed screw, or the like. The rotary speed and direction of the motor 51 are controlled by a motor controller 75. A thermal head driver 52 controls the power supply time of each heating element while the thermal head 59 is moved by a distance corresponding to one picture cell in the sub scan direction, to thereby determine the length of an ink dot in the sub scan direction in accordance with the recording density. A motor 53 rotates a take-up reel 54 so that the color area already used is wound up, and a color area to be next used is pulled out of a feed reel 55 and set at a recording position facing the recording paper 58. The controller 56 sequentially controls the motors 51 and 53 and thermal head driver 52.

Figure 6:
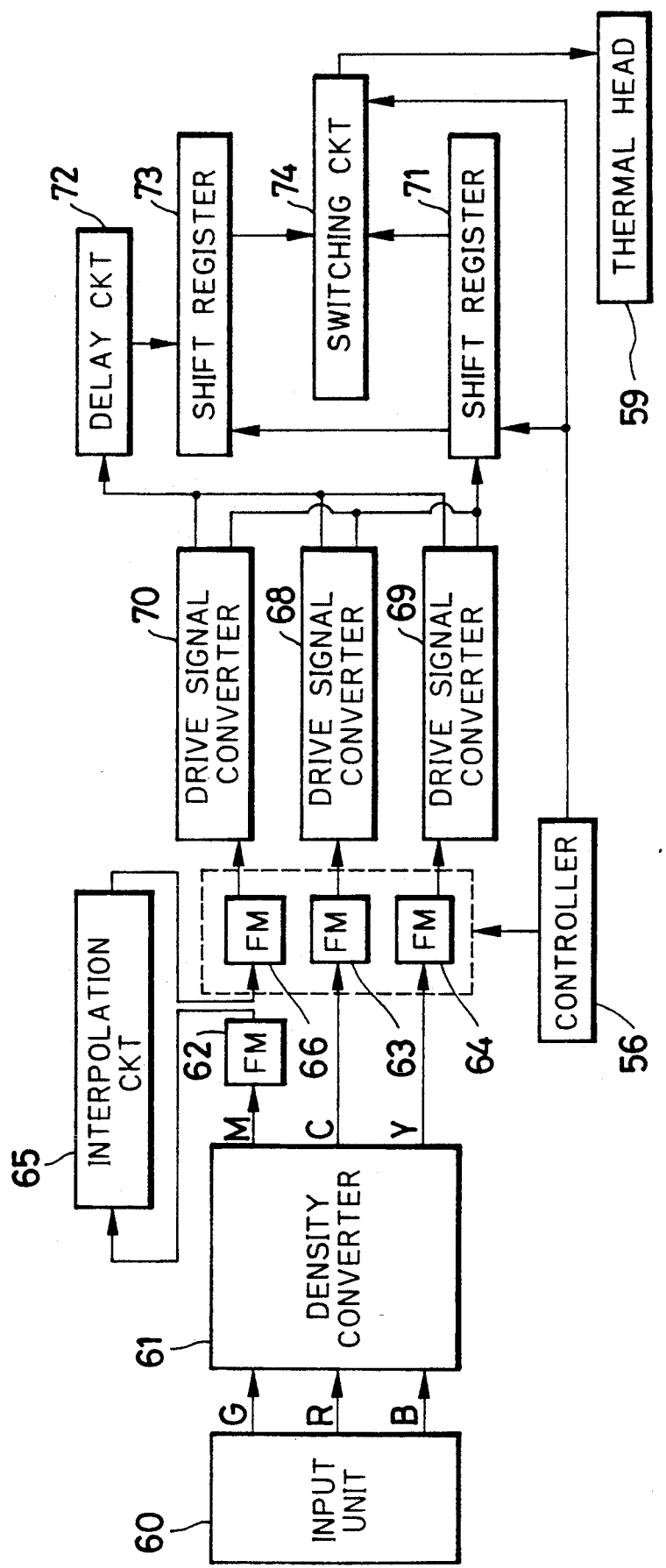
FIG. 6 is a block diagram showing an example of a thermal head driver shown in FIG. 5.

FIG. 6 shows an example of the thermal head driver 52. An input unit 60 is constructed of a TV camera, video tape recorder, or image scanner, or the like. The input unit 60 sends a green video signal G, red video signal R, and blue video signal B to a density converter 61. Based on A/D conversion and density conversion, the density converter 61 converts the three-color image signals into a magenta image signal M, cyan image signal C, and yellow image signal Y which are then written in frame memories 62 to 64, respectively.

In this embodiment, in order to avoid hue change to be caused by a shear of color registration, an interpolation circuit 65 is connected to the frame memory 62. The interpolation circuit 65 interpolates the magenta image data read from the frame memory 62 by adding one picture element to N picture elements. The image data of the interpolated picture element is written in a frame memory 66. For example, with an interpolation by 50%, one picture element is added to two picture elements disposed in the sub scan direction. As the image data of the added picture element, an average value of the image data of the two picture elements is used.

In a printing operation, a controller 56 sequentially sets a read mode to three frame memories 63, 64, and 66. Image data of one line of picture elements stored in the frame memory in the read mode are sequentially read, and sent to a corresponding one of three drive signal converters 68 to 70 where they are converted into drive signals each having a certain number of bits corresponding to the gradation step of a picture element in concern. A drive signal of a picture element of an odd number in the main scan direction among drive signals of one line of picture elements is sent to a shift register 71, whereas a drive signal of a picture element of an even number is delayed by a delay circuit 72 and sent to a shift register 73. With the delay circuit 72, dots in one line of picture elements are not disposed linearly, but the recording positions of the dots are shifted by a half pitch at every second picture cell in the sub scan direction.

If a gradation having 32 steps is used, the drive signal is assigned 32 bits per one picture element. Drive signals of picture elements are read 32 times divisionally. Specifically, at the start of recording one line of picture elements, only the first bits of respective picture elements of the drive signals are sequentially read and sent as serial signals to the shift registers 71 and 73 where they are converted into parallel signals. In this manner, bits of each digit are sequentially read at a constant time interval and sent to the shift registers 71 and 73. A switching circuit 74 is constructed of certain numbers of latch circuits and switches corresponding to the number of heating elements of the thermal head 59. Signals loaded in the shift registers 71 and 73 are latched in the latch circuits at predetermined timings. If the latch circuit takes a value "1", the corresponding switch turns ON, whereas if it takes a value "0", the switch turns OFF. When the switch turns ON, the heating element connected to the switch is powered to heat the ink film 57. The motor controller 75 causes the motor 51 to rotate in synchronism with the drive signal to the thermal head 59 and at the speed corresponding to the picture cell density in the sub scan direction. In this example, the picture cell density of magenta is higher than the densities of other two colors, so that the motor 51 is rotated at a slower speed.

Next, the operation of the embodiment apparatus will be described with reference to FIGS. 5 and 6. A video signal inputted from the input unit 60 is converted into image data and written in the frame memories 62 to 64. The magenta image data written in the frame memory 62 is subjected to an interpolation processing in the sub scan direction at the interpolation circuit 65, and thereafter written in the frame memory 66.

In making a hard copy of an image, the controller 56 drives the motor 53 to rotate the take-up reel 54. The cyan ink area 57a for example is set superposed upon the recording paper 58. Next, the controller 56 sets the frame memory 63 to a read mode to read the cyan image data of one line. The readout cyan image data of one line are converted into drive signals of 32 bits at the drive signal converter 68, which drive signals are separated into drive signals of odd and even numbers with respect to the main scan direction. The drive signals of picture elements of an odd number are converted into serial signals by aggregating bits of the same digits, and sent to the shift register 71. The drive signals of picture elements of an even number are converted into serial signals, delayed by a half pitch by the delay circuit 72, and sent to the shift register 73. The shift registers 71 and 73 convert the serial signals into parallel signals which are sent to the switching circuit 74. The switching circuit 74 turns ON the heating elements of the thermal head 59. The thermal head 59 is continuously transported in the sub scan direction by the thermal head moving mechanism 50. While the thermal head 59 is moved by the distance corresponding to the width of a picture cell in the sub scan direction, each heating element is powered for a period determined by the drive signal. In his case, the heating elements for the even number picture cells are powered at the timings delayed by a half pitch.

When the drive signal is supplied to each heating element of the thermal head 59, the ink film 57 is heated and pressed from the back surface of the cyan ink area 57a, to thereby transfer dots of softened or melted cyan ink onto the recording paper 58. Next, cyan image data of a second line are read from the frame memory 63 to record the second line of picture cells on the recording paper 58 in the like manner. After the completion of recording cyan ink dots of one frame, the motor 53 rotates to wind the ink film 57 and set the yellow ink area onto the recording, paper 58, whereas the thermal head 59 is returned to the original position. During the thermal transfer printing of an yellow image, yellow image data are read from the frame memory 64.

Figure 7:
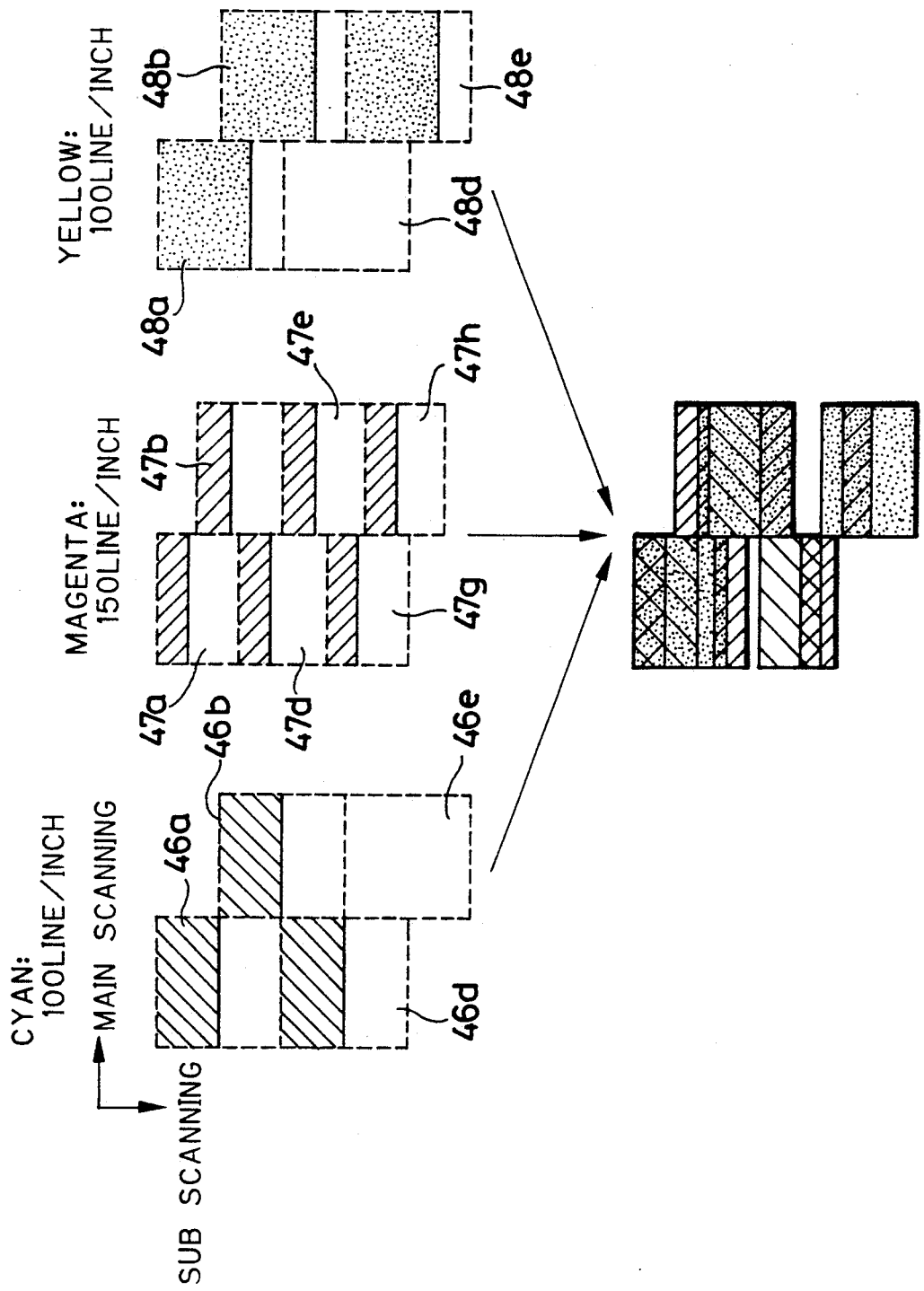
FIG. 7 illustrates recorded color inks within the picture cells shown in FIG. 4.

After the thermal transfer printing of the yellow image, the magenta ink area 57c is set onto the recording paper 58 to start the magenta image thermal transfer printing. During the magenta image thermal transfer printing, the motor controller 75 causes the motor 51 to rotate at a slower speed to make the picture cell have a slower feed speed in the sub scan direction, because the magenta picture cell density is set to 150 lines/inch in this example. If the transfer speed of a magenta ink dot is made faster, the feed speed of the thermal head 59 needs no change. In this manner, the apparatus sequentially records three types of color ink dots onto the recording paper 58 as shown in FIG. 7. The three types of color ink dots are superposed one upon another on the recording paper 58 to realize the subtractive mixture.

In this embodiment, the interpolation processing is used for changing the picture cell density. This may be achieved by changing the sampling period for converting an analog video signal into a digital signal. The picture density may be doubled by printing picture cells of a half size in the sub scan direction using the same density signals. Furthermore, the thermal head may be fixed if the ink film and recording paper superposed one upon the other are moved in the sub scan direction.

Figure 8:
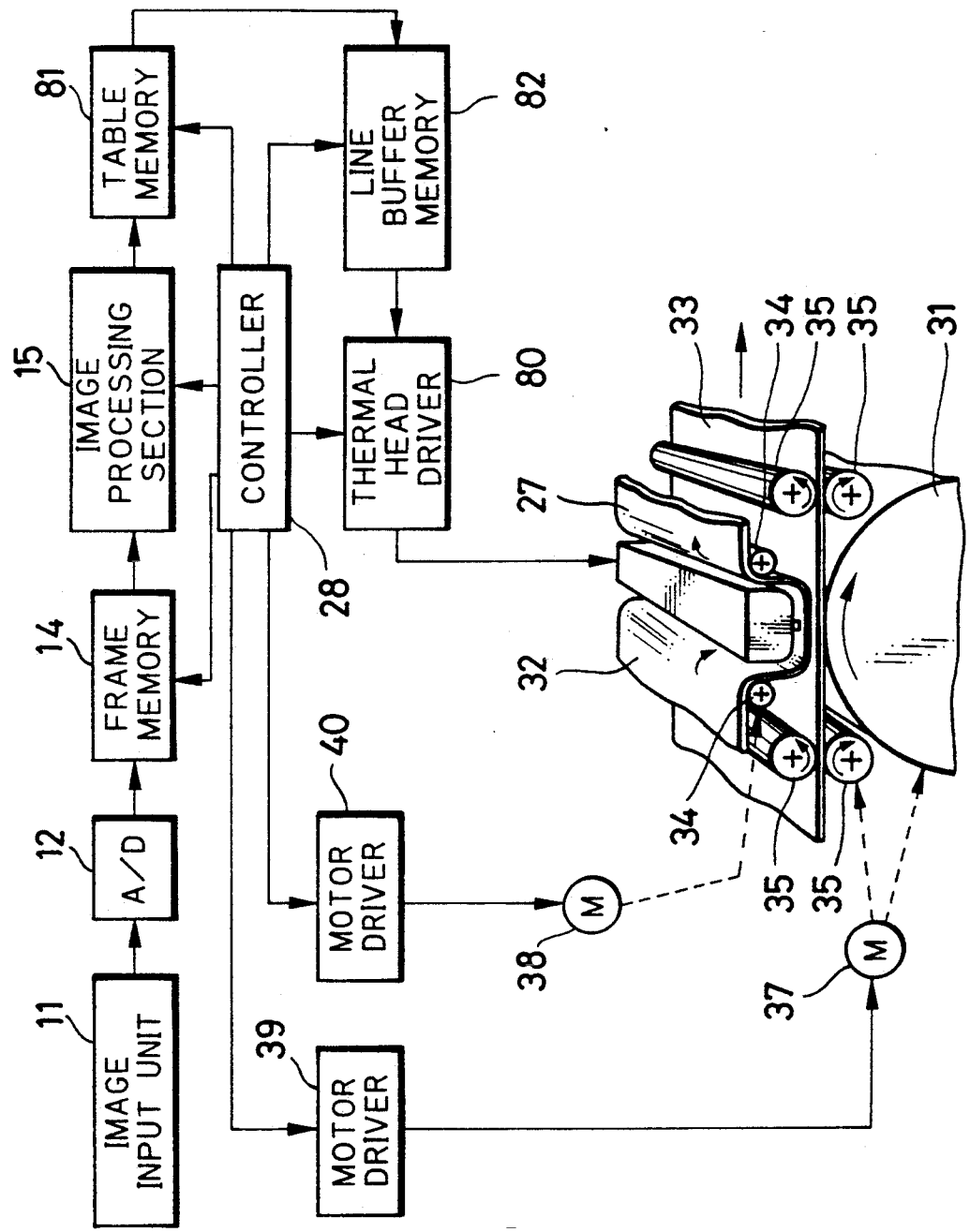
FIG. 8 is a schematic diagram showing the apparatus used for the embodiment wherein the intermittent movement amount in the sub scan direction is set shorter than the length of a heating element to achieve a high gradation.
Figure 9:
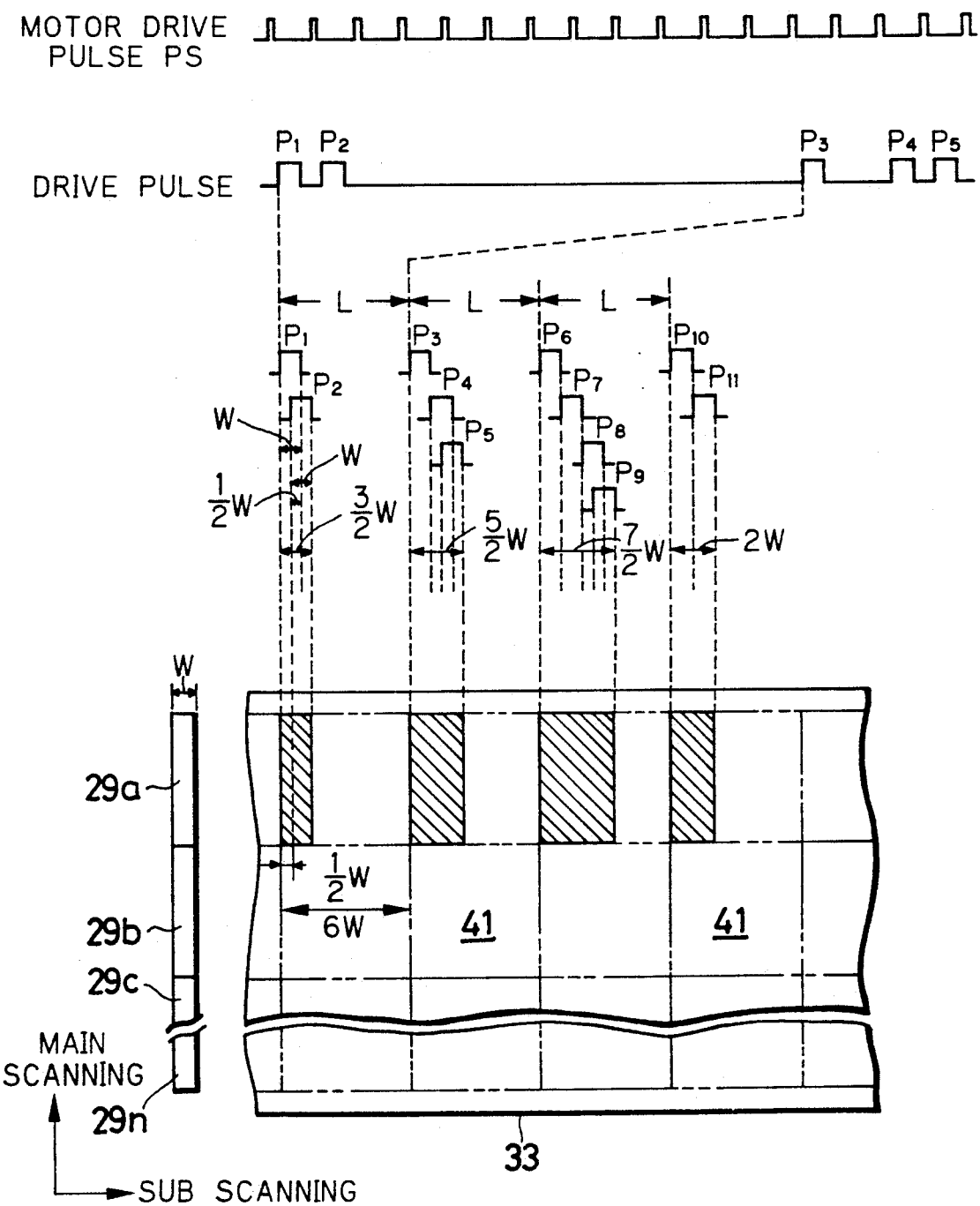
FIG. 9 illustrates signal waveforms of the apparatus shown in FIG. 8 and corresponding recorded ink dots.
Figure 10C:
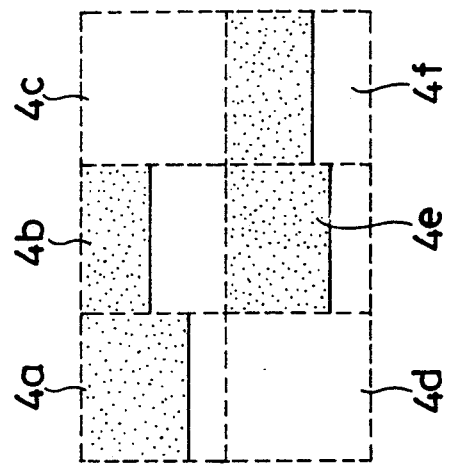
FIGS. 10A to 10C illustrate a printing method whereby the positions of ink dots are not shifted.
Figure 10B:
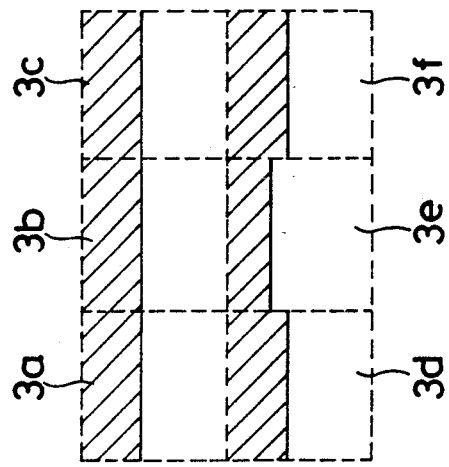
Figure 10A:
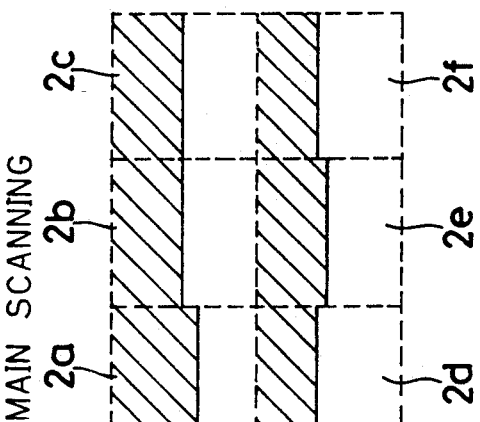

In the above embodiments, a relative movement in the sub scan direction between the heating element and the recording paper is continuous. This relative movement may be intermittent. With an intermittent movement, if the step of movement is made smaller than the width W of a heating element in the sub scan direction, a high gradation can be obtained. FIGS. 8 and 9 show such an embodiment, wherein elements like those shown in FIG. 1 are represented by using identical reference numerals. In this embodiment, heating element drive pulses outputted from a thermal head driver 80 do not include a start pulse having a large pulse width, but includes a plurality of pulses having the same pulse width. The recording area of ink dots can be changed with the number of pulses. Although this embodiment uses a monochromatic image printing, a color image printing is also applicable.

During a printing operation, image data of one line of picture elements is sent to a table memory 16 where each picture element image data is converted into drive data of 12 bits. The drive data is digital data such as "11000,...,0" and "101100,...,0". The drive data for each line is written in a line buffer memory 82. The controller 28 sequentially reads the drive data for each line from the line buffer memory 82 which are sent to a thermal head driver 80. Motor drivers 39 and 40 supply motor drive pulses PS shown in FIG. 9 to pulse motors 37 and 38, respectively so that a recording paper 33 is intermittently fed by a predetermined unit feed amount, e.g., by W/2. The first bit of the drive data "11000,..., 0" is converted by the thermal head driver 80 into the drive pulse P1 and sent to the thermal head 27. The corresponding heating element 29a is powered and heated to transfer an ink dot having a width W onto the recording paper 33.

After recording the ink dot having the width W, the recording paper 33 is intermittently fed by a W/2. Next, the second bit "1" is converted into a drive pulse P2 by the thermal head driver 80, and inputted to the thermal head 29 to again heat the heating element 29a. Similar to the ink transfer by the first drive pulse P1, an ink dot having the width W is transferred. The recording paper 33 is fed only by the unit movement amount W/2 between the first and second transfers, so that the ink dot transferred at the second time is superposed upon the first ink dot by a half of the width W. Therefore, the total ink dot width transferred by the drive pulses P1 and P2 becomes (3/2).W.

Next, when the third bit "0" is sent to the thermal head driver 18, no drive pulse is sent to the thermal head 29 even if the recording paper 33 has been fed, without transferring an ink dot onto the recording paper 33. No ink dot is transferred thereafter onto the recording paper 33. The width of the ink dots transferred only by the drive pulses P1 and P2 is 3W/2, corresponding to the drive data "11000,..., 0".

Similarly, for the case of the drive data "101100,..., 0" of the second line, drive pulses P3, P4, and P5 are sequentially sent to the heating element 29a. In this case, however, no drive pulse is generated between the drive pulses P3 and P4. During this period, two motor drive pulses PS are supplied to the pulse motors 37 and 38 so that the recording paper 33 is fed by two unit movement amounts $2 \times W/2 = W$. The ink dots transferred by the drive pulses P3 and P4 are not superposed one upon the other so that the total width 2W is obtained. The ink dot transferred by the next drive pulse P5 is superposed upon the already transferred ink dots having the total width 2W by half the width W, resulting in a total width 5W/2 corresponding to the drive data "101100,..., 0". Similarly, ink dots of the third line are transferred by drive pulses P6, P7, P8, and P9, resulting in a total width 7W/2. For the fourth line, two drive pulses P10 and P11 are supplied to the heating element 29a, resulting in a total width 2W.

As the unit movement amount, a half of the width W of the heating element 29a in the sub scan direction is used. As a result, the gradation as fine as approximately two times that when a unit movement amount is set to W can be attained without narrowing the width W of the heating element itself. In this embodiment, the unit movement amount of the recording paper is set to a half of the width W of the heating element in the sub scan direction. The present invention is not limited thereto, but the unit movement amount may by set to another value, e.g., W/3, W/4, ..., or W/N (where N is an integer). This embodiment may be applied to a thermal head having a heating element whose width in the sub scan direction is almost the same as the length in the main scan direction.

The above embodiments use a line printer where a recording paper and a thermal head are relatively moved one-dimensionally. The present invention is also applicable to a serial printer having a two-dimensional relative movement. In this case, a thermal head is used whose heating elements are disposed linearly in the longitudinal direction of a recording paper. The thermal head is moved in the widthwise direction of the recording paper to print a plurality of lines, and thereafter the recording paper is fed by a distance corresponding to the length of the thermal head. The main scan direction corresponds to the longitudinal direction of the recording paper, and the sub scan direction corresponds to the widthwise direction of the recording paper. Furthermore, not only an ink film having a definite ink melting point, but also an ink film having no definite ink melting point such as a TS ink roll (merchandise name) available from Hitachi Maxell, Ltd. may also be used. Although the thermal head is driven by the pulse for each relative movement of a predetermined distance in order to prevent the heating elements from being burnt out, alternatively the thermal head may be continuously powered throughout the powering time determined in accordance with the recording density.

Figure 4:
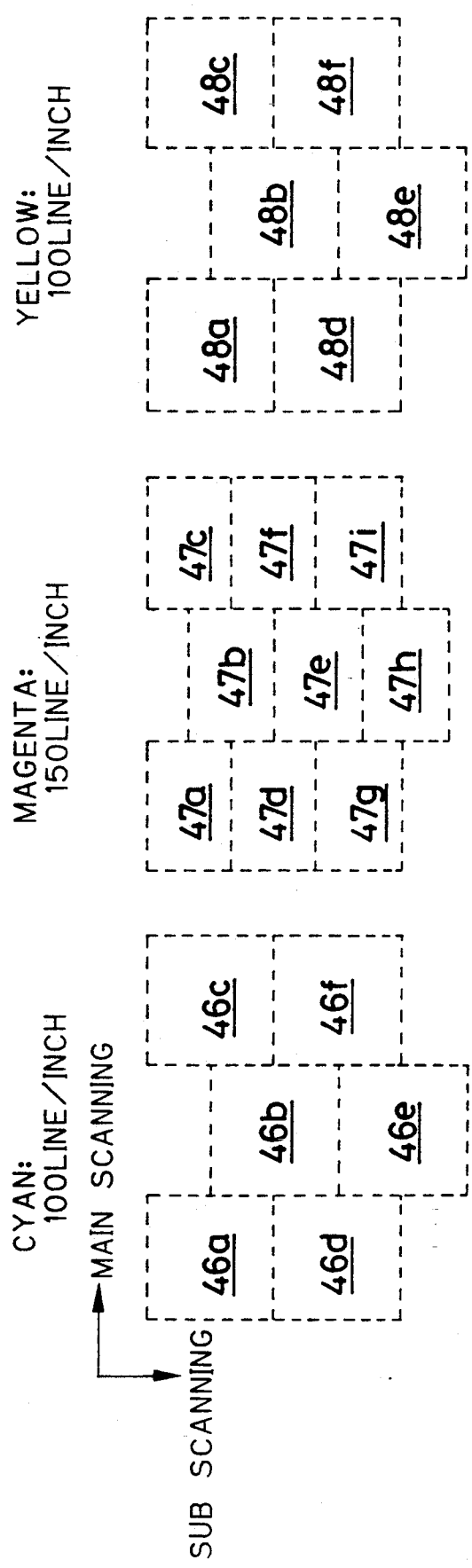
FIGS. 4A to 4C illustrate the positions of picture cells of respective colors in an embodiment which changes the picture cell density.
Figure 5:
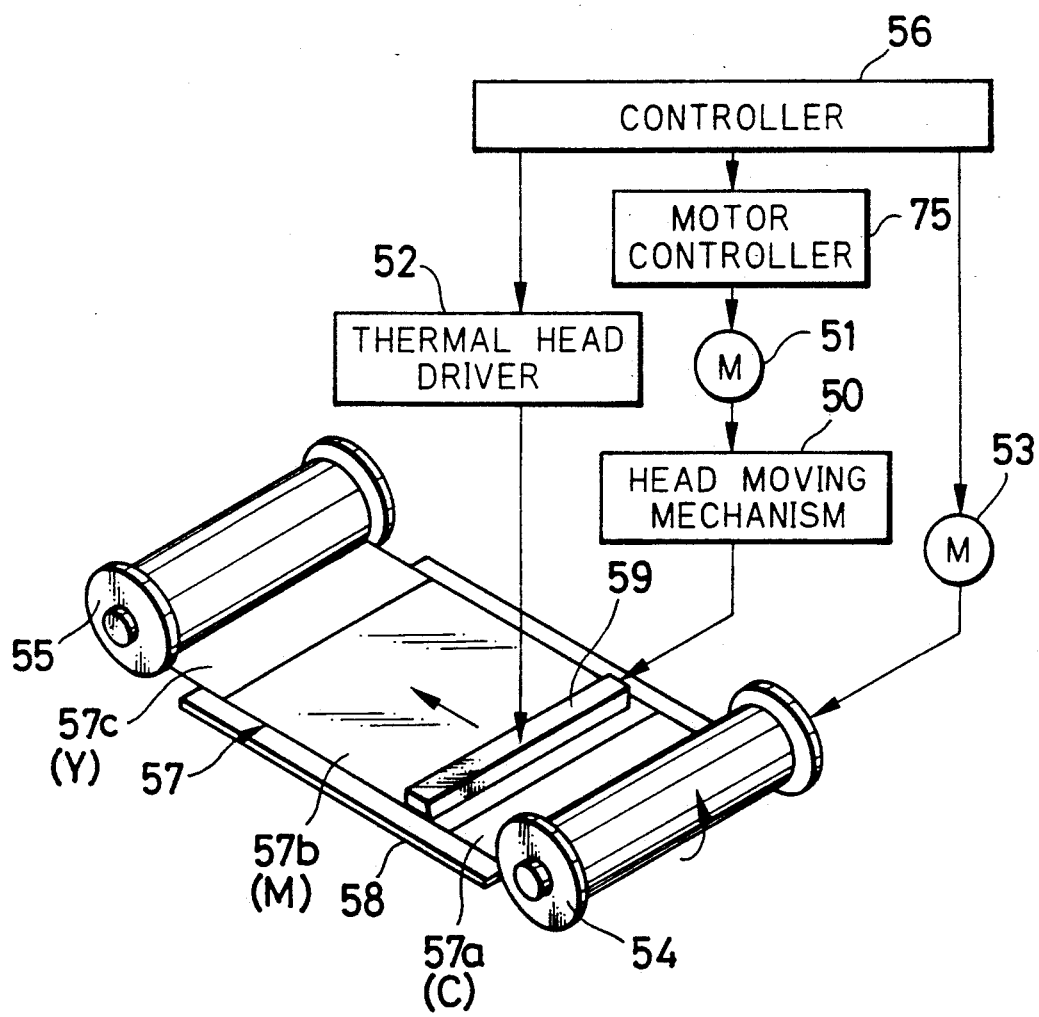
FIG. 5 is a schematic and perspective view showing the apparatus used for the embodiment shown in FIG. 4.

In the embodiment shown in FIG. 4, the cell density of the magenta picture cells relative to the sub scan direction is 150 lines per inch, which is 1.5 times as high as the cell density or minuteness of the cyan picture cells relative to the sub scan direction. The difference in cell density between magenta and cyan can prevent creation of change in hue and color moire which are due to irregularity in transportation in the sub scan direction and shears in color registration. Further experiments were conducted in order to improve the recording method. The experiments lay in producing typical examples constructed while determining differences in cell density between the three colors yellow, magenta and cyan, and while simulating shears in color registration.

The present invention utilizes the thermal head having a plurality of heating elements which are respectively elongated to extend in the main scan direction and arranged linearly. Ink dots are transferred, while melting, to the inside of the picture cells, and have areas which are changed cell by cell relative to the sub scan direction in accordance with the image density desired to be reproduced. This printing method has characteristic aspects. Specifically, irregularity in transportation of the platen drum and shears in color registration sometimes vary or shift the manners of superposition of ink dots of three colors yellow, cyan and magenta. This changes the amount of portions of subtractive color mixture where two or three color ink dots are superposed, and the amount of portions of additives color mixture where each ink dot is printed separately without superposition. The change in superposition of ink dots causes the hue to change macroscopically to the naked eye of human beings. In practicing the area gradation in image printing methods, a matrix arrangement according to which rectangular picture cells are disposed inevitably gives rise to results of changes in hue.

The further experiments as conducted lay, not in matrix arrangement, but in variant arrangements of the picture cells, such as were shifted in position between picture cells adjacent relative to the main scan direction, and as differed in size between colors. For changing cells density of picture cells, it is easy to change the size of picture cells. Shifting and size-changing of the picture cells were experimentally combined in various combinations, in order to check changes in hue caused by shears in color registration and check creation of disagreeable stripes (parallel lines) or oblique lines. Shears in color registration in the sub scan direction were simulated regarding the picture cells, by way of 80 combination of colors and shifting amounts. The most agreeable combinations of them were extracted by visual inspection of the results of printing according to the simulations of shears. The experiments as to shifting and size-changing of the picture cells taught the following:

(1) Let columns of the picture cells arranged in the sub scan direction be grouped into repeated "patterns" regularly arranged in the main scan direction, and let each pattern have at least one column which is shifted in position from the other columns in the same pattern. When each pattern consisted of three columns or more, then image noises or columnar stripes appeared between columns as regularly as the patterns, to be conspicuous to the naked eye.

(2) Let L be a length of standard picture cells in the sub scan direction. When at least one color was recorded in picture cells being 1.2 L long and the other colors were recorded in picture cells being 1.5 l long respectively in the sub scan direction, then image noises or horizontal stripes appeared in the main scan direction disagreeably every 6 L, all the more disagreeably because 3 L of the period between stripes is enough to show them conspicuously.

(3) The longer the picture cells were in the sub scan direction, the lower was the sharpness of printed images. Oblique lines in the printed images had numerous small notches which were the more conspicuous.

(4) The more the picture cells were shifted, the more conspicuous were such numerous notches of the oblique lines.

As a consequence, it has been observed that a cell arrangement which is the most favorable in view of prevention of changes in hue of printed images is such that: (1) one respective pattern for regular shifting is comprised of two columns of picture cells; (2) picture cells of two selected colors of the three colors are twice as long in the sub scan direction as picture cells of the remaining color, in other words, cell density of the former two colors is half as high in the sub scan direction as cell density of the remaining color; (3) for each of the three colors, positions of picture cells in the same column are shifted in the sub scan direction from the positioned of picture cells in the column adjacent to the former column, at an amount of half the length of the respective picture cells in the sub scan direction. Details of this construction are illustrated in FIGS. 11 to 15.

As a consequence, it has been observed that a cell arrangement which is the most favorable in view of prevention of changes in hue of printed images is such that: (1) one respective pattern for regular shifting is comprised of two columns of picture cells; (2) picture cells of two selected colors of the three colors are twice as long in the sub scan direction as picture cells of the remaining color, in other words, cell density of the former two colors is half as high in the sub scan direction as cell density of the remaining color; (3) for each of the three colors, positions of picture cells in the same column are shifted in the sub scan direction from the positions of picture cells in the column adjacent to the former column, at an amount of half the length of the respective picture cells in the sub scan direction. Details of this construction are illustrated in FIGS. 11 to 15.

Figure 12:
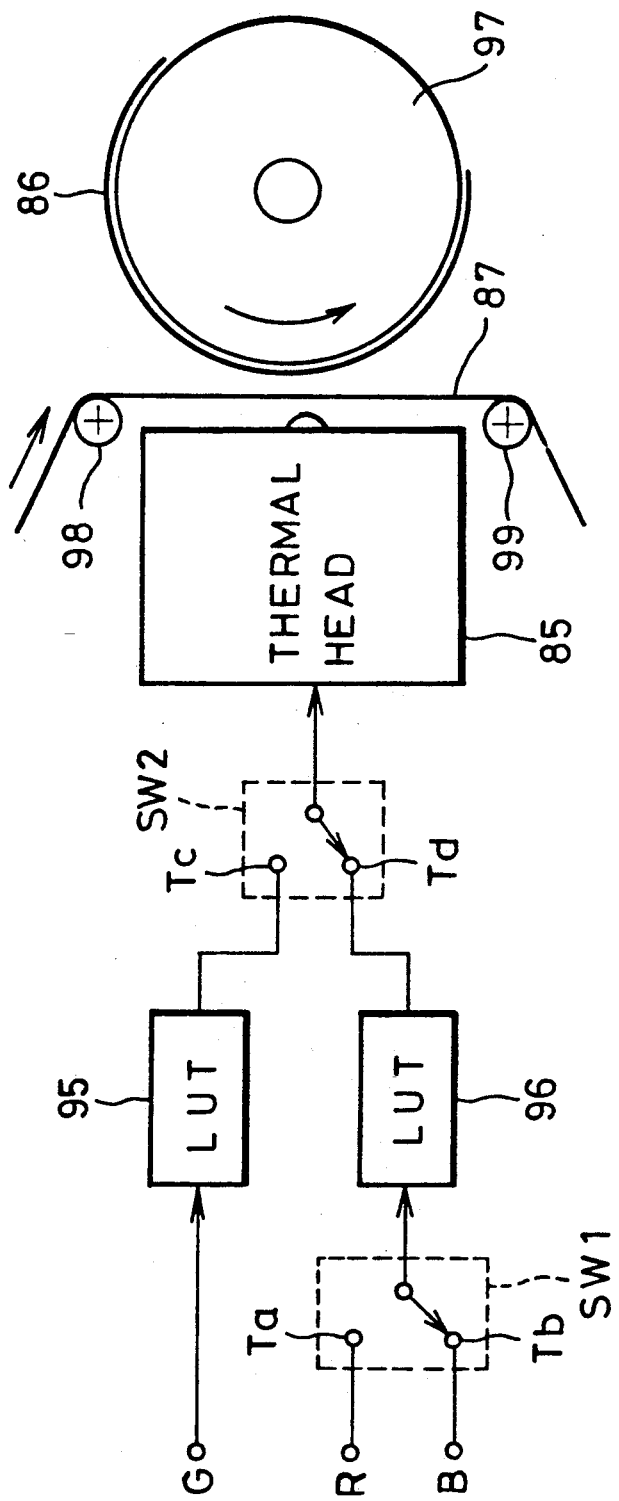
FIG. 12 is a schematic view illustrating a thermal printer for practicing the embodiment as illustrated in FIG. 11.

In FIG. 11, a thermal head 85 is comprised of a plurality of heating element 85a, 85b, 85c, ... aligned in the main scan direction to be an array. Each of the heating elements 85a etc. is rectangular, and has a length of L in the main scan direction and a range of D in the sub scan direction. L is for example 125 μm, and D is for example 30 μm. As illustrated in FIG. 12, recording paper 86 and an ink film 87 are superposed together in tight contact, and moved in the sub scan direction relative to the thermal head 85. The thermal head 85 heats the back of the ink film 87, in order to transfer the ink, as melted or softened, to the recording paper 86. The ink is stuck to the inside of one rectangular picture cell as indicated virtually, so as to form an ink dot.

A magenta (M) picture cell 88, as indicated by the broken line, is a square having the sides L long. The side of the picture cell 88 in the main scan direction corresponds to the length L of the heating elements in the main scan direction. The side of the picture cell 88 in the sub scan direction corresponds to condition of energization of each heating element. Magenta picture cells arranged adjacent relative to the main scan direction are shifted by L/2 in the sub scan direction, in order to prevent creation of moire or parallel stripes. Ink dots 89 are recorded within each picture cell 88 at the proportion in area of 50%, as indicated by the matching Two magenta picture cells arranged adjacent relative to the main scan direction constitute one pattern. A plurality of such patterns are arranged in the main scan direction.

A cyan (C) picture cell 90 and a yellow (Y) picture cell 91 are a rectangular, and have a range of L in the main scan direction and a length 2L in the sub scan direction. For cyan and yellow, picture cells arranged adjacent relative to the main scan direction are shifted by half the cell length, or L, in the sub scan direction. Reference numerals 92 and 93 designate a cyan ink dot and a yellow ink dot.

As L equals to 125 μm, the cell density of magenta is 8 dots per mm relative to either of the main scan direction and the sub scan direction. concerning cyan and yellow, the cyan density is 8 dots per mm in the main scan direction, and is 4 dots per mm in the sub scan direction. The cell density for cyan and yellow in the sub scan direction is ½ as high as that for magenta.

The greater the length of each heating element in the sub scan direction, the greater the number of steps can be in gradation to be reproduced. In the present embodiment, the steps in gradation of magenta is at most half as many as the steps in gradation of yellow and cyan. Yellow is the color of which the image quality can be least influenced by reduction in steps of gradation. Gradation of yellow in 32 steps is sufficient for reproducing a half tone image like a photographic image. It is, therefore, also preferable to control the cyan and magenta picture cells so as to be twice as long in the sub scan direction as the yellow picture cells, in other words, to determine the cell density for cyan and magenta ½ as high in the sub scan direction as that for yellow, instead of the embodiment as shown.

Figure 13:
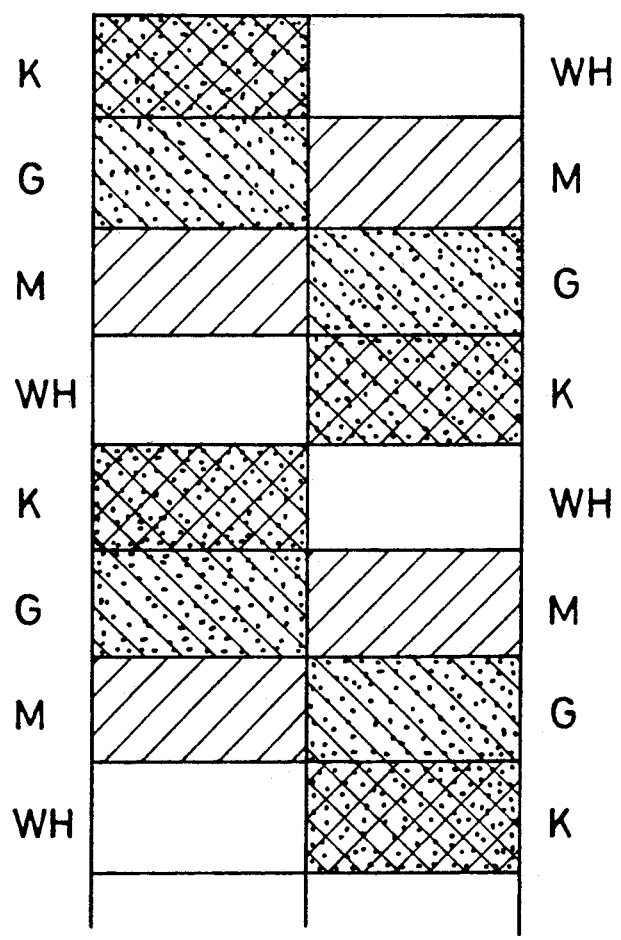
FIG. 13 is illustrative of a color pattern having two columns produced when gray is printed in a proportion of 50%.

FIG. 13 illustrates a stat in which a gray image is printed at the area proportion of 50%, by superposing the three color components of FIG. 11. A first column as reproduced in extension in the sub scan direction lies in a series of black (K), green (G), M and white (WH) repeated in cyclic fashion. A second column adjacent to the first column lies in a series of WH, M, G and K repeated in cyclic fashion. The first and second columns are inverse in the order of the color cycle. In the two columns, two colors arranged adjacent relative to the main scan direction are complementary colors of each other, such as G and M, and K and WH.

FIG. 14A illustrates a state in which a shear of color registration takes place in the yellow image so that all the yellow picture cells ar shifted upward by a range of L/4. The first column is provided with a color cycle of Y, K, G, C, M and WH, and the second column is provided with a color cycle of B, WH, M, R, G and K. Each pair of adjacent colors relative to the main scan direction in these two columns falls on complementary colors. Precisely, G in the first column in FIG. 13 is divided into G and C in FIG. 14A, and the first column in FIG. 14A newly has Y. M in the second column is divided into M and R, and the second column newly as B. Each pair of Y and B, G and M, and C and R is complementary colors, thus can be macroscopically visible to the human eye as gray. Colors of in successively arranged columns are similar to the above.

Reproduced colors are changed indeed, when the shear in color registration exists regarding yellow. However, the naked eye of human beings discern the reproduced colors, not according to individual recognition of minute ink dots but according to collective recognition of many ink dots. The colors are microscopically changed, but accompanied with maintenance in the relationship of complementary colors, so that the general hue of the reproduced image is kept unchanged. There is no conspicuous irregularity in hue.

FIG. 14B illustrates a state in which a shear of color registration takes place in the cyan image so that the cyan picture cells are shifted downward by a range of L/2. Columnar color cycles are changed by the shear of color registration in cyan, but each pair of adjacent colors in the main scan direction in the two columns falls on a pair of complementary colors. The general hue of the reproduced image is unchanged. FIG. 14C illustrates a state in which the magenta picture cells are shifted upward by a range of L/2, and the yellow picture cells are shifted upward by a range of L/4. Nothing is changed in general hue of the reproduced image, in spite of the shears in color registration.

FIG. 12 illustrates a thermal wax transfer printing apparatus in which the present invention is embodied. A green video signal is converted by a look-up table memory (LUT) 95 into a magenta drive signal. For every two picture cells adjacent relative to the main scan direction, the LUT 95 generates the drive signal in a manner having a delay in correspondence with L/2, or half the cell length. The drive signal has such a form that the size of the ink dots is changed in the range between D and L. The drive signal is sent to the thermal head 85, via a terminal Tc of a selector SW2.

A red video signal and a blue video signal are received selectively through a selector SW1, and sent to an LUT 96. For every two picture cells adjacent relative to the main scan direction, the LUT 96 generates the drive signal in a manner having a delay in correspondence with L, or half the cell length 2L. The drive signals have such a from that the size of the ink dots is changeable in the range between D and 2L. The selector SW2 is connected to either of the LUTs 95 and 96 via the terminal Tc or Td, so as to send the drive signal to the thermal head 85.

The heating element array of the thermal head 85 is arranged to be parallel to the axis of a platen drum 97. The recording paper 86 is mounted on the outer surface of the platen drum 97, and is rotated intermittently at a constant pitch, in the sub scan direction as indicated by the arrow. The ink film 87 is arranged between the recording paper 86 and the thermal head 85, guided by guide rollers 98 and 99, and moved in the sub scan direction together with the recording paper 86. The ink film 87 is provided with a cyan, magenta and yellow ink area in cyclic fashion at a constant pitch.

Figure 15:
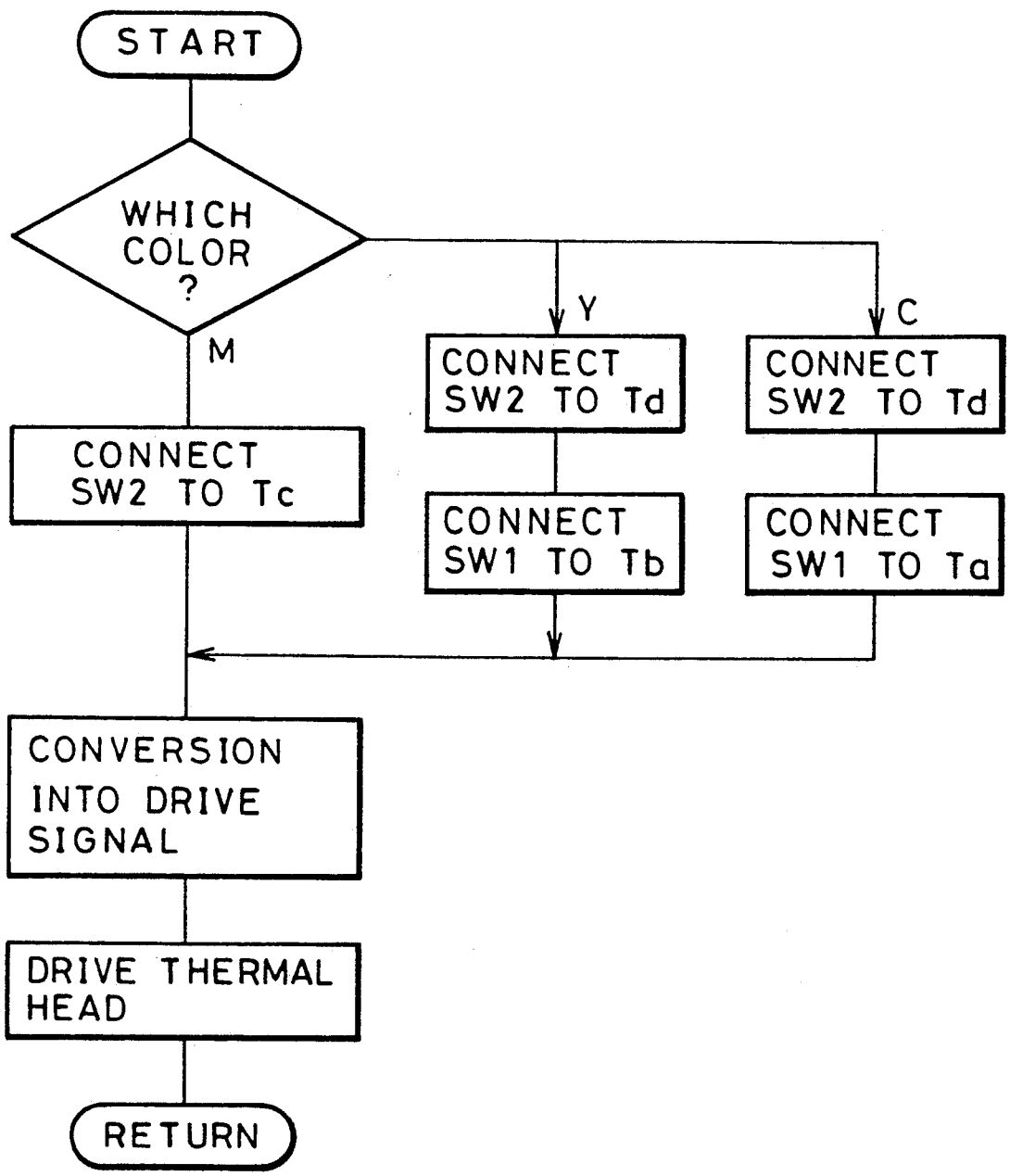
FIG. 15 is a flow chart illustrating the process of thermal recording in the thermal printer as illustrated in FIG. 12.

FIG. 15 illustrates a process of recording the image. The platen drum 97 rotates in the sub scan direction of the arrow, while holding the recording paper 86. The ink film 87 is fed in the direction of its arrow, until a beginning edge of the magenta ink area is positioned on the thermal head 85. The green video signal is converted by the LUT 96 into the magenta drive signal, and sent to the thermal head 85 via the terminal Td. The thermal head 85 is driven according to the drive signal, applies heat and pressure to the rear of the ink film 87, and transfers the molten ink to the recording paper 86. The magenta ink dots 89 are recorded in the picture cells 88 as illustrated in FIG. 11 in a manner where their sizes in the sub scan direction are changed according to the density to be recorded and they are arranged zigzag in the main scan direction. While the platen drum 97 rotates, the magenta image is recorded on to the recording paper 86 line after line.

One revolution of the platen drum 97 having been made, the beginning edge of the recording paper 86 is returned to the position of starting the recording, at the same time as the cyan ink area of the ink film 87 is set at the thermal head 98. The red video signal is sent through the terminal Ta of the selector SW1, and is converted by the LUT 96 into the cyan drive signal. The drive signal is sent through the terminal Td of the selector SW2 into the thermal head 85. The cyan ink dots 92 are recorded in the picture cells 90 as illustrated in FIG. 11, so that the cyan image is recorded line by line.

To record the yellow image, the blue video signal is sent through the terminal Tb of the selector SW1, and is converted by the LUT 96 into the yellow drive signal. The drive signal is sent through the terminal Td of the selector SW2 into the thermal head 85. The yellow ink dots 92 are recorded in the picture cells 93 as illustrated in FIG. 11, so that the yellow image is recorded line by line. While recording the yellow image, the yellow ink area is set at the thermal head 85.

Although the embodiment of FIG. 11 is associated with the cyan and magenta picture cells of the greater length and being shifted in the same direction, yet another embodiment illustrated in FIG. 16 is associated with cyan and magenta picture cells of the similarly greater length but being shifted in opposite directions, or in other words, in an alternate manner. Precisely, the cyan picture cells 90 in even columns relative to the main scan direction are shifted by the amount L or half the cell length, and yellow picture cells 101 in odd columns relative to the main scan direction are shifted by the amount L or half the cell length in order to record yellow ink dots 103. Features of the novel arrangements of the picture cells as illustrated respectively in FIGS. 11 and 16 are characterized in the following respects, in view of prevention of change in hue of the image as reproduced:

(1) Two reproduced adjacent areas of different colors in the sub scan direction appear to constitute one pair of complementary colors.

(2) A reproduced area of one color appears in the main scan direction to be adjacent to at least one area of a color complementary to the former color. (Within either columns in FIG. 11, K is adjacent to WH, and M is to G.)

(3) When there is a shear in color registration, new areas of an additional color appear. At the same time as appearance of the additional color, areas of a complementary color to the additional color appear. One or more pairs of complementary colors are adapted to compensate or cancel each other so as to prevent macroscopic changes in hue of the printed material. Such compensation is also maintained at the time of disappearance of a certain color.

(4) Because complementary pairs of colors are adjacently arranged, compensation of shears in color registration is performed in closely arranged positions.

Although the present embodiment utilizes ink comprising the three colors yellow, magenta and cyan, alternatively, ink film having black ink areas may comprise the four colors yellow, magenta, cyan and black in recording color images. The present invention, moreover, is applicable, not only to the thermal wax transfer printing, but also to a sublimation type thermal transfer printing, heat sensitive recording, ink-jet printing, electrophotographic recording, and other recording systems.

While the invention has been described in detail above with reference to the preferred embodiments, various changes and modifications within the scope and spirit of the invention will be apparent to people of working skill in this technological field. Thus, the invention should be considered as limited only by the scope of the appended claims.

We claim:

1. A color image printing method for printing a half tome color image onto recording paper with ink dots of at least three colors yellow, magenta, and cyan, said ink dots being recorded in picture cells by a recording head in which a plurality of recording elements are arranged along a main scan direction perpendicular to a sub scan direction, and a length of said ink dots in said sub scan direction being changes in accordance with a predetermined picture cell density, said method comprising the steps of:

controlling the length of the picture cells of two of said three colors in said sub scan direction so as to be twice as long as the length of the picture cells of the one remaining color in said sub scan direction; and shifting respective positions for said three colors of adjacent picture cells in said main scan direction by half said length of said respective picture cells in said sub scan direction.

2. A method according to claim 1, wherein said recording head includes a plurality of heating elements disposed linearly and said heating element heat a back of said ink film so as to transfer said ink dots to said recording paper.

3. A method according to claim 2, wherein said shifting of said positions along said sub scan direction is in a same direction for said three colors.

4. A method according to claim 2, wherein said shifting of said positioned in said sub scan direction is in opposite directions for said two colors having twice the length of the picture cells of the one remaining color.

5. A thermal wax transfer type color printing method wherein a color image including a plurality of picture cells having a half tone ink deposition imprint area therein is printed on a recording paper using three types of ink including the colors cyan, magenta, and yellow, said method comprising the steps of:

positioning a thermal head including a plurality of heating elements over said recording paper along a main scan direction;

providing relative movement between said thermal head and said recording paper in a subscan direction perpendicular to said main scan direction;

setting a predetermined picture cell density for each color along said sub scan direction, the picture cell density being defined as the picture cell size per unit length along said sub scan direction;

driving said heating elements during said relative movement to deposit said ink on the recording paper and controlling the length of the ink deposition for the respective imprint areas in said picture cells along said sub scan direction; and generating a picture cell density difference along said sub scan direction at least between the colors cyan and magenta whereby hue change and color moire can be eliminated.

6. A method according to claim 5 wherein a first density difference generated along the sub scan direction between the colors cyan and magenta eliminates hue change.

7. A method according to claim 6 wherein a second density difference generated along the sub scan direction eliminates both hue change and color moire, said second density difference being greater than said first density difference.

8. A method according to claim 5 and further comprising the step of shifting the respective positions of alternate picture cells of said colors cyan, magenta and yellow in said sub scan direction by a predetermined amount relative to immediate adjacent picture cells thereof whereby picture pattern moire can be eliminated.

9. A method according to claim 8 wherein said step of shifting comprises shifting the positions of alternate picture cells in the sub scan direction by an amount W/N, wherein W represents a length of said picture cell along said sub scan direction, and N represents an integer.

10. A method according to claim 8 wherein said step of shifting comprises shifting alternate picture cells in the range of 20% to 80% of a picture cell length in the sub scan direction.

11. A method according to claim 8 wherein said step of shifting comprises shifting alternate picture cells by substantially one half of a picture cell length in the sub scan direction.

12. A method according to claim 5 wherein said ink deposition imprint area comprises a rectangular imprint area.

13. A method according to claim 5 wherein said relative movement comprises continuous relative movement one line at a time in the sub scan direction.

14. A method according to claim 5 wherein said relative movement comprises intermittent relative movement one line at a time in the sub scan direction.

15. A method according to claim 5 wherein said step of providing relative movement comprises providing relative movement from an initial position for a distance corresponding to one picture cell in said sub scan direction to determine the length of said ink deposition imprint area within a picture cell and thereafter returning to said initial position.

16. A method according to claim 5 and additionally including the step of superimposing individual ink deposition imprint areas of said colors cyan, magenta and yellow to produce a subtractive ink mixture.

17. A thermal wax transfer type color printing method wherein a color image including a plurality of picture cells having a half tone ink deposition imprint area therein is printed on a recording paper using three types of ink including the colors cyan, magenta, and yellow, said method comprising the steps of:

positioning a thermal head including a plurality of heating elements over said recording paper along a main scan direction;

providing relative movement between said thermal head and said recording paper in a subscan direction perpendicular to said main scan direction;

setting a predetermined picture cell density for each color along said sub scan direction, the picture cell density being defined as the picture cell size per unit length along said sub scan direction;

driving said heating elements during said relative movement to deposit said ink on the recording paper and controlling the length of the ink deposition for the respective imprint areas in said picture cells along said sub scan direction;

generating a picture cell density difference along said sub scan direction at least between the colors cyan and magenta whereby hue change and color moire can be eliminated; and shifting the respective positions of alternate picture cells of said colors cyan, magenta and yellow in said sub scan direction by a predetermined amount relative to immediate adjacent picture cells thereof whereby picture pattern moire can be eliminated.

18. A method according to claim 17 wherein said relative movement is continuous or intermittent for a distance corresponding to one picture cell length in the sub scan direction.

* * * * *